United States Patent [19]

De Lucia

[11] 3,984,733
[45] Oct. 5, 1976

[54] INTERLOCK SAFETY SWITCHING CIRCUIT FOR X-RAY APPLIANCE AND THE LIKE

[75] Inventor: Victor E. De Lucia, Los Angeles, Calif.

[73] Assignee: Torr Laboratories, Inc., Van Nuys, Calif.

[22] Filed: Jan. 31, 1975

[21] Appl. No.: 546,079

[52] U.S. Cl. .......................... 317/9 A; 200/153 T; 219/10.55 C; 317/135 R
[51] Int. Cl.[2] ........................................ H02H 3/00
[58] Field of Search .......... 126/197, 266; 200/50 C, 200/61.62, 61.74–61.76, 61.81, 61.82, 153 T; 219/10.55 B–10.55 D, 10.75, 10.77; 307/94, 113, 115, 117, 141–141.8; 317/9 A, 135 R, 60 A

[56] References Cited
UNITED STATES PATENTS

| | | | |
|---|---|---|---|
| 2,895,083 | 7/1959 | Quinlan | 307/94 X |
| 3,105,130 | 9/1963 | Weiford, Jr. | 200/153 T X |
| 3,329,795 | 7/1967 | Long | 219/10.75 X |
| 3,480,753 | 11/1969 | Wilson et al. | 219/10.55 D |
| 3,699,300 | 10/1972 | Buerki | 219/10.55 C |
| 3,816,688 | 6/1974 | Fritts | 219/10.55 C |
| 3,857,067 | 12/1974 | Zanboorie | 317/9 A |
| 3,865,097 | 2/1975 | Robinson | 126/197 |

Primary Examiner—James R. Scott
Attorney, Agent, or Firm—Keith D. Beecher

[57] ABSTRACT

An interlock switch assembly is provided to prevent the application of electrical power to an X-ray unit when the access port or door is opened. The interlock switch includes two microswitches connected in series. The microswitches are actuated when the door is closed by a plunger mounted in the door which moves against a pair of spaced electrically conductive spring contact strips, and moves the strips against the actuator buttons of the microswitches. The plunger includes a pair of contact posts which establish electrical connection with the strips as the plunger is moved against the strips, and an electrical shunt is provided across the posts so that when the plunger contacts the strips, an electrical connection is provided from one strip to the other. The switch assembly provides electrical switching without arcing when the door is opened and closed under normal conditions. The interlock switch also assures that contact will be broken to the X-ray unit, even in the event that the power relay is welded into a closed condition, this being due to the fact that the plunger physically breaks the electrical connection between the contact strips, in addition to actuating the microswitches, when the door is opened.

5 Claims, 3 Drawing Figures

INTERLOCK SAFETY SWITCHING CIRCUIT FOR X-RAY APPLIANCE AND THE LIKE

BACKGROUND OF THE INVENTION

The interlock switch assembly of the invention is constructed for use in X-ray systems in order to protect the health and safety of the personnel operating such systems. However, it will become evident as the description proceeds that the switch assembly of the invention has general application for providing an effective electrical interlock which operates in conjunction with access doors or ports, and which positively prevents the application of electric power to the equipment when such access doors or ports are opened, even in the event of failure of the power relay in the electrical system.

Although interlock systems have been used in the past, many medical and industrial accidents have occurred in X-ray laboratories, where the interlock systems have failed, and the operators are inadvertently subjected to exposure of X-rays and other harmful radiations and emissions. An important feature of the interlock switch assembly of the present invention is that it assures that the power is cut off from the X-ray machine, or the like, when the access door is opened. Unlike the prior art safety interlock systems, the switch assembly of the present invention assures that power to the equipment will be cut off when the access door is opened, even in the event that the safety interlocks themselves should fail.

The power disconnect feature of the interlock switch assembly of the invention is accomplished, as mentioned briefly above, by means of two microswitches connected in series, and which are respectively actuated by two electrically conductive spring strips which are spaced and insulated from one another. The spring strips are normally biased out of contact with the actuator buttons of the microswitches. However, whenever the door is closed, a short-circuited plunger unit, which is mounted in the door, is moved against the spring strips to move them against the actuator buttons of the microswitches so as to actuate the microswitches.

The short-circuited plunger unit also provides a bridging electrical contact between the spring strips which serves to complete the circuit to the high voltage transformer primary of the X-ray generator. This means that even though the power relay may fail in a conductive condition, the circuit to the X-ray generator high voltage transformer is still broken by the interlock switch assembly of the invention when the door is opened.

Therefore, the circuits associated with the interlock switch assembly of the invention are such that power can be applied to the X-ray machine only when the door is closed, at which time the circuits are closed mechanically and electrically and only then can the machine be activated. Under normal operation, arcing between the plunger and the spring strips is prevented, since the microswitches open the circuit to the power control relay to de-energize that relay prior to the physical breaking of contact between the plunger and the spring strips of the safety interlock switch assembly.

The interlock switch assembly of the invention may have an added safety feature, in that it may include an indicator lamp which becomes energized whenever the power control relay is actuated to a closed condition. If a failure should occur in which the relay is welded in a closed condition, the indicator lamp will remain energized, even though the door is opened, apprising the operator that such failure has occurred.

DETAILED DESCRIPTION OF THE ILLUSTRATED EMBODIMENT

Figure 1:
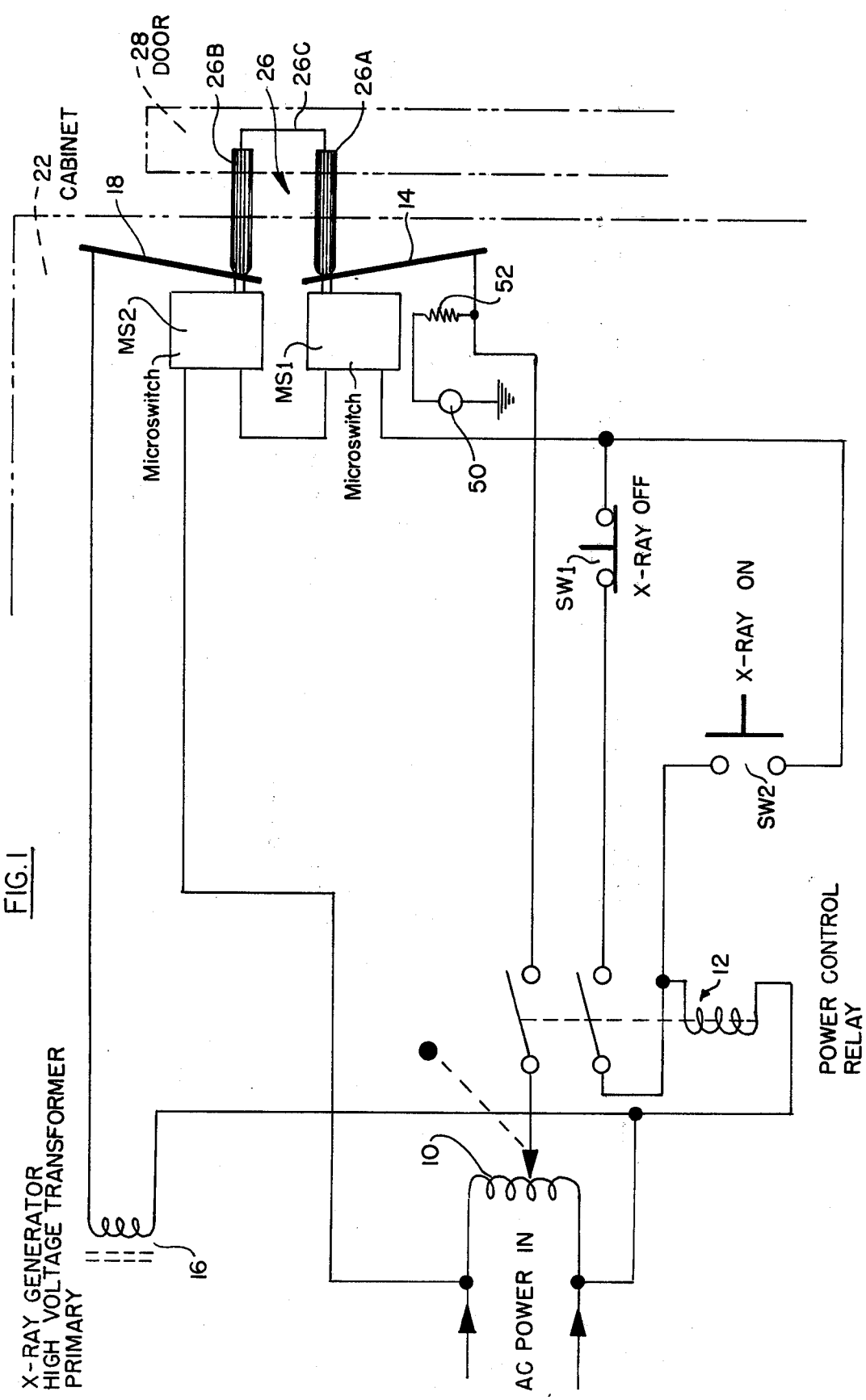
FIG. 1 is a schematic diagram showing the components of the safety interlock switch assembly of the invention, and various components of an X-ray generator energizing circuit, in which the switch assembly is incorporated.

In the system of FIG. 1, alternating current power at a relatively low voltage is applied to a variable voltage transformer 10, which constitutes the usual high voltage control for the X-ray generator. On side of the transformer 10 is connected through a pair of normally open contacts of a relay 12 to one of the electrically conductive spring actuator strips 14 of the interlock switch assembly of the invention. The other side of the transformer 10 is connected to one side of the primary winding of the usual high voltage X-ray generator transformer 16. The high voltage X-ray tube is energized through a usual circuit (not shown) connected to the secondary of the high voltage transformer 16.

The other side of the variable voltage transformer 10 is also connected to the energizing coil of the power control relay 12. The other side of the energizing coil is connected through a pair of normally open holding contacts of the relay and through a push button stop switch SW1 to a first microswitch MS1 in the interlock switch assembly of the invention. The other side of the energizing winding of the relay 12 is also connected through a push button start switch SW2 to the microswitch MS1.

The microswitch MS1 is connected in a series with a second microswitch MS2 in the interlock switch assembly of the invention, and the latter microswitch is connected back to the other side of the variable voltage transformer 10. A second electrically conductive spring activator strip 18 is mounted in the interlock switch assembly adjacent the actuator button of the microswitch MS2.

Figure 2:
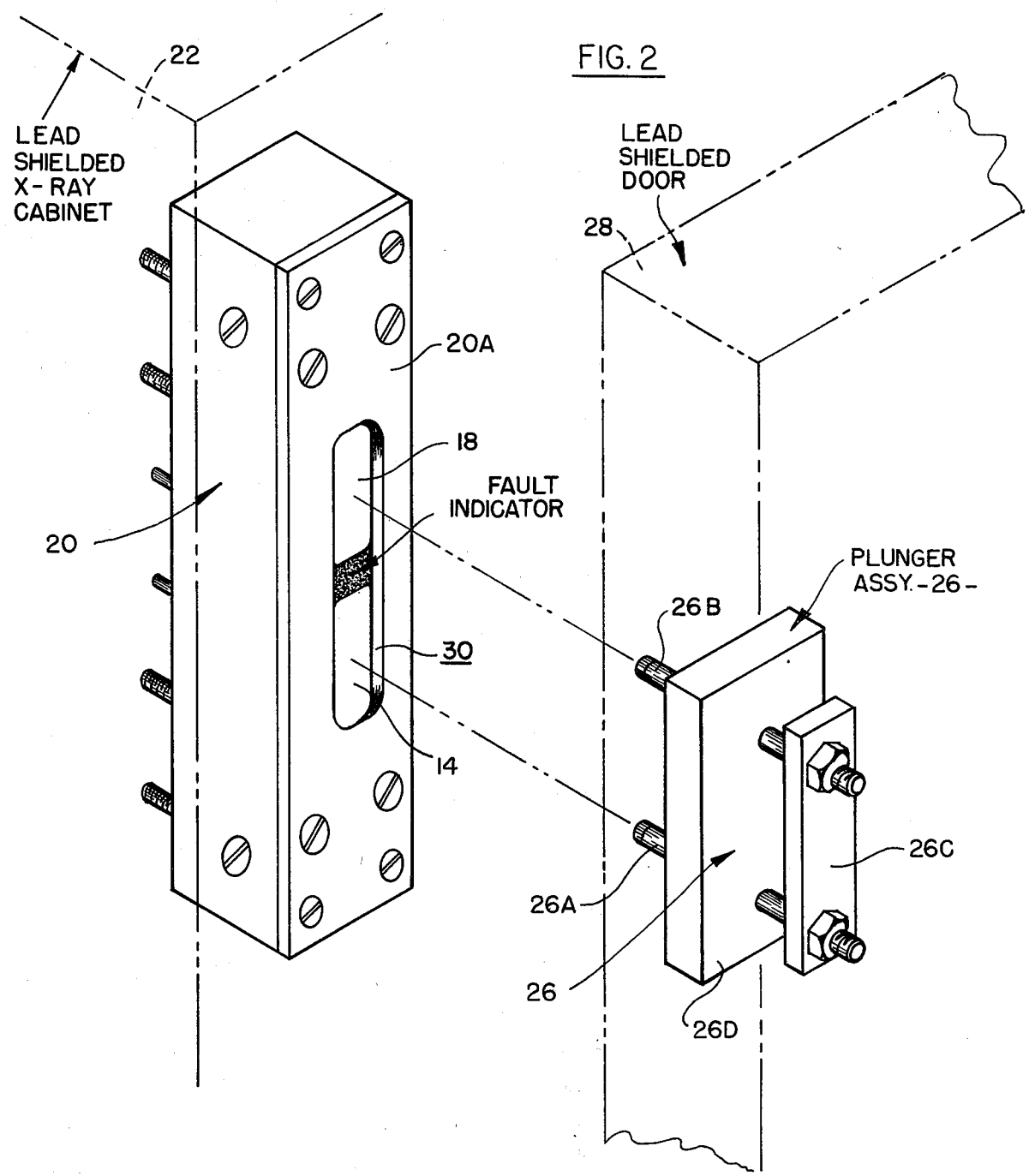
FIG. 2 is a perspective representation of the switch assembly of FIG. 1, showing the assembly mounted in the edge of the cabinet which houses the X-ray generator, and showing a plunger assembly mounted in the access door of the cabinet, in position to engage the operating components in the switch assembly when the door is closed.
Figure 3:
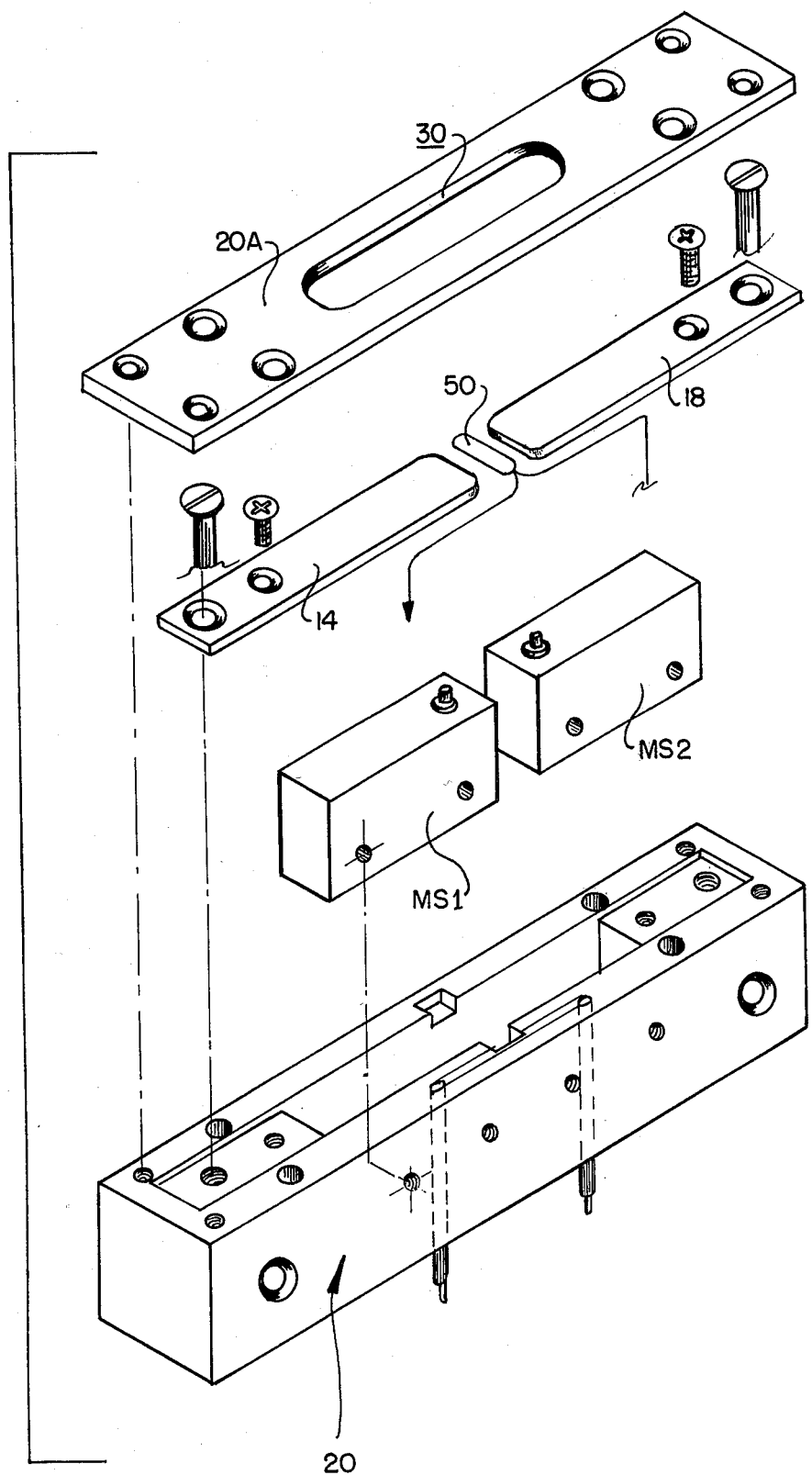
FIG. 3 is a perspective exploded representation of the various components of the switch assembly which are mounted in the X-ray cabinet.

As best shown in FIGS. 2 and 3, the various components of the interlock switch assembly are mounted in a housing 20 which, in turn, is mounted in the cabinet 22 which houses the X-ray system, adjacent one edge of the cabinet. A short-circuited plunger unit 26 is mounted in the door 28 of the cabinet 22, in position so that its contact posts 26A and 26B will move into a slot 30 in the top cover 20A of the housing and against the respective spring activator strips 14 and 18.

The contact posts 26A and 26B are interconnected by an electrical shunt 26C, so that when the door is closed, the posts not only move the activator strips 14 and 18 against the actuator buttons of the microswitches MS1 and MS2, but also establish an electrical connection across the two strips, thereby completing the circuit to the primary of the high voltage transformer 16. The posts 26A and 26B are threaded into the base 26D of the plunger, to be adjustable, so as to assure that each post has the proper length to establish positive contact with the respective activator strips 14 and 18, and to positively force the springs against the actuator buttons of the respective microswitches MS1, MS2.

During normal operation of the system, the door 28 is closed, so that the system assumes the operating condition shown in FIG. 1, in which the actuator strips 14 and 18 are forced against the actuator buttons of the microswitches MS1 and MS2, so that the microswitches are actuated, and the plunger 26 establishes electrical connection across the actuator strips 14 and 18. Now, the switch SW2 may be momentarily operated to energize the power control relay 12 to cause the relay to close its contacts and turn on the unit. Power is now supplied to the primary of the transformer 16 through the relay contacts, and across the actuator strips 14 and 18, and through the plunger 26. The high voltage of the generator may then be controlled, in usual manner, by manual control of the variable voltage transformer 10, until the associated meter indicates that the required high voltage has been achieved. The holding contacts of the power relay 12 maintain the power relay energized under these conditions, through the normally closed switch SW1, even though the switch SW2 is now open.

To terminate the operation, the push button switch SW1 is operated to break the holding circuit, and to cause the power control relay 12 to become de-energized. The relay contacts then open breaking the circuit to the primary of the transformer 16.

An indicator lamp 50 may be provided, which is connected through a ballast resistor 52 to the actuator strip 14, and this indicator lamp is energized whenever the power control relay contacts are closed. The ballast resistor may be mounted either internally or externally of the housing 20. The lamp 50 may be a neon lamp, and as shown in FIG. 3, may be mounted in the housing 20 between the actuator strips 14 and 18. This lamp is in position to be observed whenever the door is opened. Under normal conditions, the lamp should be off, since the power control relay 12 is normally de-energized when the door is opened. However, should the power control relay fail in a closed condition, the lamp 50 will turn on, when the variable transformer 10 is increased to 75% of full value, indicating the failed condition to the operator.

Under normal conditions, should the door 28 be opened while the system is in its "on" condition, the microswitches MS1 and MS2 will open, breaking the connection to the power control relay, so that the power control relay will become de-energized, opening its relay contacts, and breaking the circuit to the primary of the transformer 16. Thereafter, as the door is further opened, the contact posts 26A and 26B will break with the actuator strips 14 and 18, but no arcing will occur, since the circuit will have been already broken by the microswitches. In closing the door, the contact is first made with the actuator strips 14 and 18 by the plunger 16, and the actuator strips are then pushed against the buttons of the microswitches MS1 and MS2. Only then may the system be energized, by momentarily depressing the switch SW2.

Should the power control relay fail, so that its contacts become welded into the closed condition, the microswitches MS1 and MS2 are no longer capable of opening the circuit, since even though the power control relay is de-energized, its contacts remain closed, and the transformer 16 remains energized. However, under those conditions, when the door is opened, the plunger 26 physically breaks contact with the actuator strips 14 and 18 to break the high voltage circuit. The indicator lamp 50 now will glow, apprising the operator of the failed condition, when the variable transformer 10 is turned up, as mentioned above. An appropriate test for this condition can be carried out periodically, under safe conditions since the opening of the door assures that the X-ray generator will be de-activated.

The invention provides, therefore, an improved and simplified interlock switch assembly which provides absolute assurance that under no conditions will an operator of an X-ray unit, or the like, be susceptible to harmful radiation by the opening of the access door, since the safety interlock switch assembly of the invention provides absolute assurance that the energizing circuit will be de-energized when the door is opened.

It will be appreciated that although a particular embodiment of the invention has been shown and described, modifications may be made. It is intended in the claims to cover the modifications which come within the spirit and scope of the invention.

What is claimed is:

1. An interlock safety switching circuit for X-ray equipment, and the like, the equipment being contained in a cabinet having an access door, and the switching circuit serving to prevent the application of electric power to the equipment when the access door is opened, the circuit including: a first normally-open electric switch and a second normally-open electric switch, each of said switches including a spring-biased actuator button; a source of electric energy; a first circuit connecting the first and second electric switches in series with one another across the said source; first and second electrically-conductive switch-actuator members mounted in said cabinet in spaced, electrically insulated relationship with one another, and biased to be normally spaced from respective ones of the actuator buttons of said switches and movable into engagement therewith to actuate the switches; an electrically conductive plunger member mounted on the door in position to be spaced from the switch actuator members when the door is open and to move against the switch actuator members in bridging electrical engagement therewith to complete a circuit between the switch actuator members and further to cause the switch actuator members to move against the actuator buttons to cause the buttons to actuate the first and second switches when the door is closed; and a second circuit connecting the source through the first and second switch actuator members and through said plunger member to the X-ray equipment.

2. The interlock safety switching circuit defined in claim 1, and which includes a power control relay energizing coil included in the first circuit, and said relay having a pair of normally-open contacts included in the second circuit.

3. The interlock switching circuit defined in claim 1, in which the electrically conductive switch-actuator members are each in the form of an elongated resilient metallic strip supported within the cabinet at one end of each such strip, and each of the strips extending over the actuator button of the corresponding switch in normally spaced relationship therewith.

4. The interlock safety switching circuit defined in claim 2, and which includes an electrically energized indicator lamp mounted in the cabinet, said lamp being electrically connected to one of the electrically conductive switch actuator members to be energized when the normally-open relay contacts are closed.

5. The interlock safety switching circuit defined in claim 1, in which the plunger member includes a pair of adjustable electrically conductive posts extending outwardly from the plane of the inner surface to the door and into the cabinet in spaced parallel relationship with one another, said posts being positioned to engage corresponding ones of the switch actuator members when the door is closed, and an electrically conductive shunt connected across the posts.

* * * * *